(12) United States Patent
Ingersoll et al.

(10) Patent No.: US 12,677,820 B2
(45) Date of Patent: Jul. 14, 2026

(54) WEED TREATMENT SYSTEMS

(71) Applicant: Deere & Company, Moline, IL (US)

(72) Inventors: Tiffany L. Ingersoll, Maxwell, IA (US); Erik A. Sorensen, Warren, PA (US)

(73) Assignee: Deere & Company, Moline, IL (US)

( * ) Notice: Subject to any disclaimer, the term of this patent is extended or adjusted under 35 U.S.C. 154(b) by 48 days.

(21) Appl. No.: 18/888,730

(22) Filed: Sep. 18, 2024

(65) Prior Publication Data

US 2026/0076355 A1     Mar. 19, 2026

(51) Int. Cl.
 A01M 7/00 (2006.01)
 A01M 21/04 (2006.01)
(52) U.S. Cl.
 CPC ........ A01M 7/0089 (2013.01); A01M 7/0085 (2013.01); A01M 21/043 (2013.01)
(58) Field of Classification Search
 CPC . A01M 7/0089; A01M 7/0085; A01M 21/043
 See application file for complete search history.

(56) References Cited

U.S. PATENT DOCUMENTS

| | | | |
|---|---|---|---|
| 9,489,576 B2 * | 11/2016 | Johnson | A01B 79/005 |
| 10,120,543 B2 | 11/2018 | Sugumaran et al. | |
| 10,986,778 B2 * | 4/2021 | Chaney | A01M 21/02 |
| 11,051,505 B2 * | 7/2021 | Humpal | A01M 7/005 |
| 11,259,515 B2 * | 3/2022 | Loukili | G06F 18/2323 |
| 11,589,496 B2 * | 2/2023 | Van De Woestyne | A01C 21/005 |

| | | | |
|---|---|---|---|
| 11,983,009 B2 | 5/2024 | Vandike et al. | |
| 12,010,986 B2 * | 6/2024 | Kwak | A01C 23/047 |
| 12,035,707 B2 * | 7/2024 | Long | G05D 1/692 |
| 2015/0278640 A1 * | 10/2015 | Johnson | G06V 20/188 382/110 |

(Continued)

FOREIGN PATENT DOCUMENTS

| | | |
|---|---|---|
| DE | 10247490 A1 | 4/2004 |
| EP | 4256930 A1 | 10/2023 |

(Continued)

OTHER PUBLICATIONS

Extended European Search Report and Written Opinion issued in European Patent Application No. 25190586.5 dated Jan. 28, 2026, in 12 pages.

*Primary Examiner* — Sihar A Karwan
(74) *Attorney, Agent, or Firm* — Lucian Wayne Beavers; Patterson Intellectual Property Law, PC

(57) ABSTRACT

A system for spraying an agricultural field provides a weed distribution model including information corresponding to a weed distribution as a function of geographic location within the field. An initial portion of the field is sprayed with a first product from a first tank leaving a remaining portion of the field to be sprayed. A quantity of the first product from the first tank required to complete the spraying of the remaining portion of the field is estimated based at least in part on the weed distribution model, the estimated quantity being less than the first tank capacity. The estimated quantity of the first product is loaded into the first tank so that the remaining portion of the field may be sprayed with the first tank being empty, at least to a threshold level, at the end of the spraying of the remaining portion of the field.

16 Claims, 6 Drawing Sheets

(56)                    References Cited

U.S. PATENT DOCUMENTS

| | | | |
|---|---|---|---|
| 2017/0228118 A1* | 8/2017 | Sugumaran | G06F 3/0484 |
| 2020/0128732 A1* | 4/2020 | Chaney | A01M 21/02 |
| 2022/0151216 A1* | 5/2022 | Stuber | A01M 7/0089 |
| 2022/0183208 A1* | 6/2022 | Sibley | A01B 69/001 |
| 2023/0324910 A1* | 10/2023 | Vandike | A01B 79/005 |
| | | | 701/1 |
| 2024/0000002 A1* | 1/2024 | Kiepe | A01M 7/0096 |
| 2024/0138280 A1* | 5/2024 | Lovett | A01B 69/008 |
| 2024/0206451 A1* | 6/2024 | Anderson | A01M 21/046 |
| 2025/0073732 A1* | 3/2025 | Chaney | B05B 12/004 |

FOREIGN PATENT DOCUMENTS

| | | | |
|---|---|---|---|
| EP | 4256957 A1 | 10/2023 | |
| WO | WO 2011045650 A2 | 4/2011 | |

* cited by examiner

WEED TREATMENT SYSTEMS

BACKGROUND

1. Field of the Disclosure

The present disclosure relates to systems for weed treatment of an agricultural field using selective spraying systems.

2. Background of the Disclosure

There are many different types of agricultural machines. One such machine is an agricultural applicator machine configured to apply an agricultural substance (liquid or dry forms) to a field. One example agricultural applicator machine includes an agricultural spraying machine or sprayer. An agricultural sprayer, for example, often includes a tank or reservoir that holds a substance to be sprayed on an agricultural field. Such systems typically include a supply line or conduit mounted on a foldable, hinged, or retractable and extendible boom. The supply line is coupled to one or more spray nozzles mounted along the boom. Each spray nozzle is configured to receive the substance and direct the substance to a crop or field during application. As the sprayer travels through the field, the boom is moved to a deployed position and the substance is pumped from the tank or reservoir, through the nozzles, so that it is sprayed or applied to the field over which the sprayer is traveling. Such sprayers may include control systems configured to detect and selectively spray one or more types of plant material detected in the path of the sprayer.

The discussion above is merely provided for general background information and is not intended to be used as an aid in determining the scope of the claimed subject matter.

SUMMARY

In a first embodiment a method is provided of operating an agricultural sprayer, the sprayer including a first tank having a first tank capacity for holding a first product to be sprayed. The method includes:

providing a weed distribution model for a field, the weed distribution model including information corresponding to a weed distribution as a function of geographic location within the field;

spraying an initial portion of the field with the agricultural sprayer with the first product from the first tank, thereby leaving a remaining portion of the field to be sprayed;

estimating with a processor an estimated quantity of the first product from the first tank required to complete the spraying of the remaining portion of the field based at least in part on the weed distribution model, the estimated quantity being less than the first tank capacity; and loading the estimated quantity of the first product into the first tank so that the remaining portion of the field may be sprayed with the first tank being empty, at least to a threshold level, at the end of the spraying of the remaining portion of the field.

In another embodiment an agricultural sprayer includes a first tank having a first tank capacity for holding a first product to be sprayed, and a second tank having a second tank capacity for holding a second product to be sprayed. More than two tanks and more than two products may be used. A product application system includes a plurality of selectively actuatable applicator mechanisms configured to apply the first and second products on a field. An imaging system is configured to obtain image data indicative of plant matter on the field. A control system is configured to:

receive a weed distribution model for the field, the weed distribution model including information corresponding to a weed distribution as a function of geographic location within the field;

identify a remaining portion of the field which has not yet been sprayed with the first product and the second product;

estimate a first estimated quantity of the first product from the first tank and a second estimated quantity of the second product from the second tank required to complete the spraying of the remaining portion of the field based at least in part on the weed distribution model;

display the first estimated quantity and the second estimated quantity on a display observable by an operator of the machine so that the operator may load the first tank and the second tank with amounts of the first and second product, respectively, sufficient to complete the spraying of the remainder of the field with the first tank and the second tank being empty, at least to a threshold level, at the end of the field;

detect the presence of weeds of a first weed type ahead of the sprayer and selectively spray the weeds of the first weed type with the first product; and detect the presence of weeds of a second weed type ahead of the sprayer and selectively spray the weeds of the second weed type with the second product.

Numerous objects, features and advantages of the embodiments set forth herein will be readily apparent to those skilled in the art upon reading of the following disclosure when taken in conjunction with the accompanying drawings.

DETAILED DESCRIPTION

Targeted application of herbicides and other products applied with agricultural sprayers allows sprayer owners to apply product in areas where it is needed, and more importantly, not apply product in areas where it is not needed. But with targeted spraying it is much more difficult to predict the amount of product needed to complete a given task. The present disclosure combines the advantages of targeted spraying with the use of a weed distribution model to predict the required product usage to complete a given task. The weed distribution model may also be used for other purposes. The weed distribution model may be used to predict how much product to order and have on-hand for the season by sensing weed types and distribution. The weed distribution model may be used to prioritize the order to spray fields based on sensed weed types and distribution.

Targeted Spraying

Figure 1:
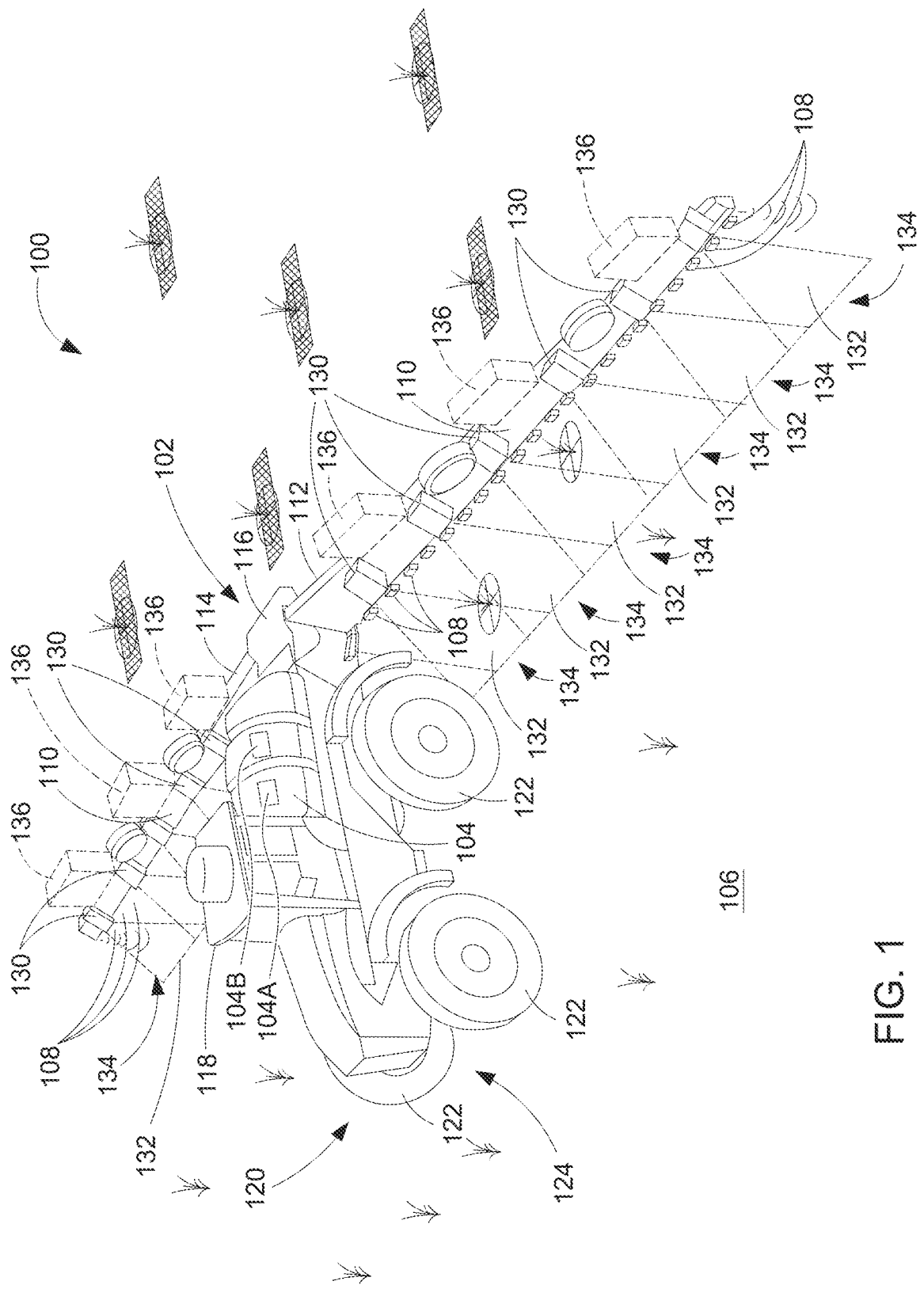
FIG. 1 is a schematic perspective view of an agricultural sprayer spraying weeds in a field.

FIG. 1 illustrates one example of an agricultural spraying machine (or agricultural sprayer) 100. Machine 100 may also be more generally referred to as a mobile agricultural material application machine 100. Machine 100 includes a spraying system 102 having at least one tank 104 containing a liquid that is to be applied to a field 106. The at least one tank 104 may include a first tank 104A and a second tank 104B. Tanks 104 are fluidically coupled to spray nozzles 108 by a delivery system comprising a set of conduits. A fluid pump is configured to pump the liquid from tank(s) 104 through the conduits through nozzles 108. Spray nozzles 108 are coupled to, and spaced apart along, boom 110. Boom 110 includes arms 112 and 114 which can articulate or pivot relative to a center frame 116. Thus, arms 112 and 114 are movable between a storage or transport position and an extended or deployed position (shown in FIG. 1). Machine 100 includes an operator compartment 118, a steering system 120 including a set of wheels 122, or other traction elements, and a propulsion system 124 (e.g., internal combustion engine). The spraying system 102 may also be referred to as a product application system 102 and the nozzles 108 may be described as selectively actuatable applicator mechanisms 108 for applying the product from the tanks 104.

Figure 2:
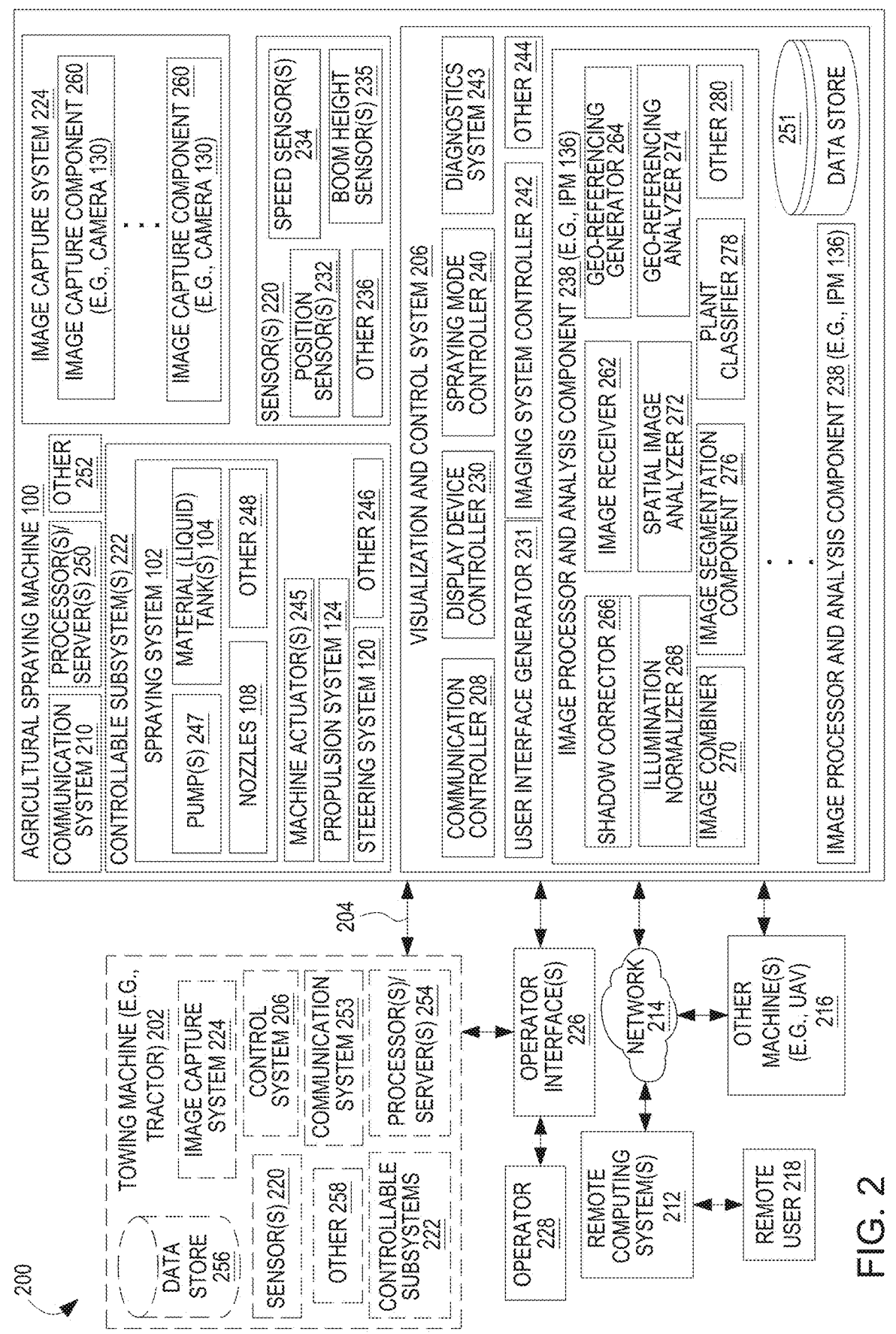
FIG. 2 is a block diagram of one example of an agricultural machine architecture including the control system of the agricultural sprayer.

FIG. 2 is a block diagram illustrating one example of an agricultural machine architecture 200 including agricultural spraying machine 100. It is noted that while agricultural spraying machine 100 is illustrated as a self-propelled machine in the present example, in other examples spraying machine 100 can include a towed implement coupled to a towing machine 202. An example of towing machine 202 includes a tractor that is coupled to machine 100 through one or more links 204 (electrical, mechanical, pneumatic, etc.).

Machine 100 includes a visualization and control system 206 (also referred to as control system 206) configured to control other components and systems of machine 100. For instance, control system 206 includes a communication controller 208 configured to control communication system 210 to communicate between components of machine 100 and/or with other machines or systems, such as remote computing system 212 and/or machine(s) 216, either directly or over a network 214. Network 214 can be any of a wide variety of different types of networks such as the Internet, a cellular network, a local area network, a near field communication network, or any of a wide variety of other networks or combinations of networks or communication systems.

A remote user 218 is illustrated interacting with remote computing system 212. Remote computing system 212 can be a wide variety of different types of computing systems. For example, remote computing system 212 can include remote server environment that is used by remote user 218. Further, it can include a mobile device, remote network, or a wide variety of other remote systems. Remote computing system 212 can include one or more processors or servers, a data store, and it can include other items as well.

Communication system 210 can include wired and/or wireless communication logic, which can be substantially any communication system that can be used by the systems and components of machine 100 to communicate information to other items, such as between control system 206, sensors 220, controllable subsystems 222, and an image capture system 224. In one example, communication system 210 communicates over a controller area network (CAN) bus (or another network, such as an Ethernet network, etc.) to communicate information between those items. The information can include the various sensor signals and output signals generated by the sensor variables and/or sensed variables.

Control system 206 is configured to control interfaces, such as operator interface(s) 226 that include input mechanisms configured to receive input from an operator 228 and output mechanisms that render outputs to operator 228. The input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc. Accordingly, control system 206 includes a display device controller 230 configured to control one or more display devices on, or associated with, machines 100 or 202 and a user interface generator 231 configured to generate user interface displays that are rendered on the display devices.

Sensor(s) 220 can include any of a wide variety of different types of sensors. In the illustrated example, sensors 220 include position sensor(s) 232, speed sensor(s) 234, boom height sensor(s) 235, and can include other types of sensors 236 as well. Position sensor(s) 232 are configured to determine a geographic position of machine 100 on the field, and can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal. Speed sensor(s) 234 are configured to determine a speed at which machine 100 is traveling the field during the spraying operation. Speed detection can utilize sensors that sense the movement of ground-engaging elements (e.g., wheels or tracks) and/or can utilize signals received from other sources, such as position sensor(s) 232. Boom height sensor(s) 235 are configured to detect a height of a portion of the boom from the ground surface. Examples of height sensors include optical sensors, ultrasonic sensors, etc. Alternatively, or in addition, the sensors can include accelerometers, gyroscopes, inertial measurement units (IMUs), to name a few.

Control system 206 includes image processor and analysis components 238 (also referred to as image processing components 238), a spraying mode controller 240, an imaging system controller 242, a diagnostics system 243, and can include other items 244 as well. Control system 206 is configured to generate control signals to control communication system 210, sensors 220, controllable subsystems 222, or any other items in architecture 200. Controllable subsystems 222 include spraying system 102, steering system 120, propulsion system 124, machine actuators 245, and can include other items 246 as well. Spraying system 102 includes one or more pumps 247, configured to pump the agricultural substance (e.g., a liquid chemical) from tank 104 through conduits to nozzles 108 mounted on boom 110. Spraying system 102 can include other items 248 as well.

Control system 206 is configured to generate control signals to control spraying system 102 to apply the substance to identified field areas. For example, depending on where a target field area is located within an image, component 238 communicates a "spray" command to the appropriate nozzle(s) via a controller area network (CAN) bus. In one example, upon the nozzles receiving the spray command, the nozzle executes the spray command based on when it receives the command, a travel velocity of the nozzle, and other attributes that impact the spray reaching the target area. Examples include, but are not limited to, environmental conditions, plant height, etc. The nozzles are controlled to remain open for a period of time that is sufficient to cover the target area.

Machine 100 includes one or more processors or servers 250, a data store 251, and can include other items 252 as well. Data store 251 is configured to store data for use by machine 100. For example, data store 251 can store field location data that identifies a location of the field, field shape and topography data that defines a shape and topography of the field, crop location data that is indicative of a location of crops in the field (e.g., the location of crop rows), or any other data.

As also illustrated in FIG. 2, where towing machine 202 tows agricultural spraying machine 100, towing machine 202 can include some of the components discussed herein with respect to machine 100. For instance, towing machine 202 can include some or all of sensors 220, component(s) of control system 206, some or all of controllable subsystems 222 and/or some or all components of system 224. Also, towing machine 202 can include a communication system 253 configured to communicate with communication system 210, one or more processors or servers 254, a data store 256, and it can include other items 258 as well.

Image capture system 224 includes one or more image capture components 260 configured to capture images of the field, and image processing components 238 are configured to process those images. Examples of an image processing component 238 include an image signal processor or image processing module (IPM).

With reference to the example shown in FIG. 1, image capture components 260 include a plurality of cameras 130 spaced along boom 110. Each camera 130 corresponds to one or more of nozzles 108 and includes a field of view (FOV) 132 configured to image a portion 134 of the field that is to be sprayed by the corresponding nozzle(s) 108. Further, as generally represented in FIG. 1 at reference numerals 136, machine 100 includes a plurality of image processing components 136 (such as IPMs). Each image processing component 136 is configured to receive and process images from one or more of cameras 130. The following discussion will also refer to image capture components 260 as cameras 260, but it is understood that other image capture components can be utilized as well. The cameras 130 may capture images in the visible light spectrum as well as imagery outside of the visible light spectrum. For example images in the near infrared (NIR) or radar information (Synthetic Aperture Radar) may be captured by the cameras 130.

Referring again to FIG. 2, the captured images represent a spectral response captured by image capture system 224 that are provided to image processing components 238 and/or stored in data store 251. A spectral imaging system obtains spectral images of the field under analysis. For instance, a camera can be a multispectral camera or a hyperspectral camera, or a wide variety of other devices for capturing spectral images. The camera can detect visible light, infrared radiation, or otherwise. In one example, a vision system includes red green blue (RGB) cameras, near infra-red red green (NRG), or near infra-red (NIR) cameras.

In one example, cameras 260 include stereo cameras configured to capture still images, a time series of images, and/or a video of the field. An example stereo camera captures high definition video at thirty frames per second (FPS) with one hundred and ten degree wide-angle FOV. Of course, this is for sake of example only.

Illustratively, a stereo camera includes two or more lenses with a separate image sensor for each lens. Stereo images (e.g., stereoscopic photos) captured by a stereo camera allow for computer stereo vision that extracts three-dimensional information from the digital images. In another example, a single lens camera can be utilized to acquire images (referred to as a "mono" image).

Image processing component 238 includes an image receiver 262 configured to receive the images from image capture system 224, a geo-referencing generator 264 configured to geo-reference the images to locations in the field, a shadow corrector 266 is configured to perform shadow correction on the images, and an illumination normalizer 268 configured to normalize illumination in the image. Also, ambient lighting conditions can be acquired utilizing a white balance camera or an incident light sensor, for example. Ambient lighting conditions can be used to correct for daylight color, light direction/position, and/or lighting intensity. Further, acquired images of the targeted application/spray area can be corrected for lens distortion, tones/color correction, etc. Acquired images can be remapped or resized according to camera height and adjusted for ambient lighting conditions.

An image combiner 270 is configured to combine a number of images into a larger image of the field under analysis. For instance, image combiner 270 can stitch or mosaic the images. In order to mosaic the images, geographic location information corresponding to each of the images can be used to stitch the images together into a larger image of the field under analysis, which is then analyzed by image processing component 238. Further, the geo-referencing of images can be done automatically against the ground control points, or it can be done manually as well.

Image processing component 238 is configured to process the image data of the field acquired from the corresponding camera(s) 260 to identify plant matter in those images, and characteristics (i.e., type, health, maturity, etc.) of the plants. For example, image processing component 238 is configured to identify areas of the field that include crop plants and/or areas that include weed plants. For sake of the present discussion, a "weed" or "weed plant" refers to a non-crop plant identified in the field. That is, weeds include plant types other than crop plants (e.g., corn plants in a corn field) expected to be present in the field under consideration. In the corn field example, weeds or weed plants include plants other than corn plants.

Spatial image analyzer 272 is configured to perform spatial analysis on the images, and spectral image analyzer 274 is configured to perform spectral analysis on the images. Spatial image analyzer 272, in one example, obtains previously generated crop location data which provides a geographic location of the rows of crop plants (or the plants themselves). Spectral image analyzer 274 performs spectral analysis to evaluate the plants in the images. In one example, spectral analysis includes identifying areas in the image that have a spectral signature that corresponds to ground versus plants. For instance, spectral analysis can include a green/brown comparison.

An image segmentation component 276 is configured to perform image segmentation on a received image, to segment or divide the image into different portions for processing. A plant classifier 278, which can be trained using plant training data stored in data store 251, or obtained otherwise, is configured to identify areas in the image that represent a target plant type (e.g., crop plants, weed plants), depending on the spraying application being performed. For example, weed identification logic can identify weeds in the image, based on the image segmentation performed by image segmentation component 276. The weed identification may for example identify weeds of a first weed type and weeds of a second weed type. The first and second weed types may, for example, be grass and broad leaf weeds respectively, which are known to respond to different types of herbicides for control. Other weed types may also be targeted. The location of plants can be stored as plant location data in data store 251. Image processing component 238 can include other items 280 as well.

Spraying mode controller 240 is configured to selectively operate spraying system 102 to apply a substance (i.e., chemicals or nutrients) to the field using a plurality of different spraying modes. Examples of the substance include, but are not limited to, herbicides, fertilizers, fungicides, or other chemicals, for pest control, weed control, growth regulation, fungus control, crop nutrient support, etc. The substance may include the first product as stored in the first tank 104A for treatment of weeds of the first weed type, and the second product as stored in second tank 104B for treatment of weeds of the second weed type.

Figure 3:
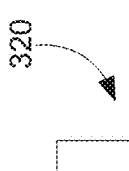
FIG. 3 is a schematic perspective view of the agricultural sprayer selectively spraying first and second weed types with first and second products from first and second tanks.

Spraying system 102 is controlled by controller 240 in a spraying mode that applies the substance to targeted areas. The targeted areas are identified using images acquired by image capture system 224 and processed by image processing components 238 to identify locations of crop plants and/or weed plants, to be sprayed, within those images. An example of the second spraying mode is illustrated in FIG. 3 and includes an automated spraying control or precision spraying operation 320 that controls a subset of the nozzles 108 to spray precise dispersal areas 322, such as directly on a plant (crop or weed), in between plants, or otherwise, at a particular rate so that a target quantity of the substance is applied to the dispersal area. Precision spraying applications in precision farming and application techniques can reduce the use of substances, such as pesticides resulting in reduced grower costs and a reduction in environmental stress.

For example, a first product suitable for treatment of a first weed type may be loaded in the first tank 104A and a second product suitable for treatment of a second weed type may be loaded in the second tank 104B. Then as the sprayer 100 moves through the field the processor and sensors of the spraying system may detect weeds of the first weed type and selectively spray weeds of the first weed type with the first product. And the processor and sensors of the spraying system may detect weeds of the second weed type and selectively spray weeds of the second weed type with the second product. As shown in FIG. 3, areas 322A detected as containing weeds of the first weed type may be sprayed with the first product from first tank 104A, and areas 322B detected as containing weeds of the second weed type may be sprayed with the second product from the second tank 104B. The first and second weed types may, for example, be grass and broad leaf weeds, respectively. The spraying system may avoid spraying locations in the field not including weeds of either the first weed type or the second weed type.

The system may of course selectively spray plants of more than two types. The system could carry a third tank filled with a third product, and then detect and selectively spray a third plant type. The system may also include a broadcast spray mode in which a give product is broadcast over the entire field.

Weed Distribution Models and Predictive Modeling

One problem addressed by the present disclosure is the need for prediction of the amount of product that will be used to treat the weeds in a field. This is particularly important when a final portion of a field is to be sprayed and the amount of product needed to complete the spraying is less than a full tank load of product. In order to avoid completing the spraying project with substantial amounts of product left in the tanks 104A and 104B it is desirable to predict the amount of each product which is needed and to only load the tanks with the needed amount. Then the spraying task may be completed and at the end of the task the tanks will be empty, at least to a threshold level. The threshold level may be selected as an allowable percentage (of tank capacity) or an allowable absolute remaining product volume. This avoids the economic loss incurred if substantial left over product must be dumped or unloaded and stored.

Such predictions of product usage may be made based on a weed distribution model. A weed distribution model includes any informational structure including information corresponding to a weed distribution as a function of geographic location in a field to be treated. The weed distribution model may come in many forms. The information in the weed distribution model may also be in a "negative" form; for example, the information may identify the location of the rows of crops, and then anything that is not in a row may be treated as a weed.

The most fundamental weed distribution model may include images of the geographic area which images show the weeds in the geographic area of interest. The images may be analyzed by image processing techniques to determine the presence of weeds at various locations within the images. The images may be gathered in any suitable manner. The images may be collected from cameras or sensors carried by the sprayer or other agricultural machine in a prior pass through the field. The images may be collected using drone or satellite imaging techniques.

A more refined weed distribution model may be created by the image processing to generate a data model identifying the weed distribution as a function of the geographic location in the field.

A still more refined weed distribution model may convert either of the above mentioned models to a predictive model identifying a predictive product usage corresponding to the weed distribution to be treated as a function of geographic location within the field.

In another example the weed distribution model may itself be a predictive model that is predictive of weed distribution based upon other information.

Figure 5:
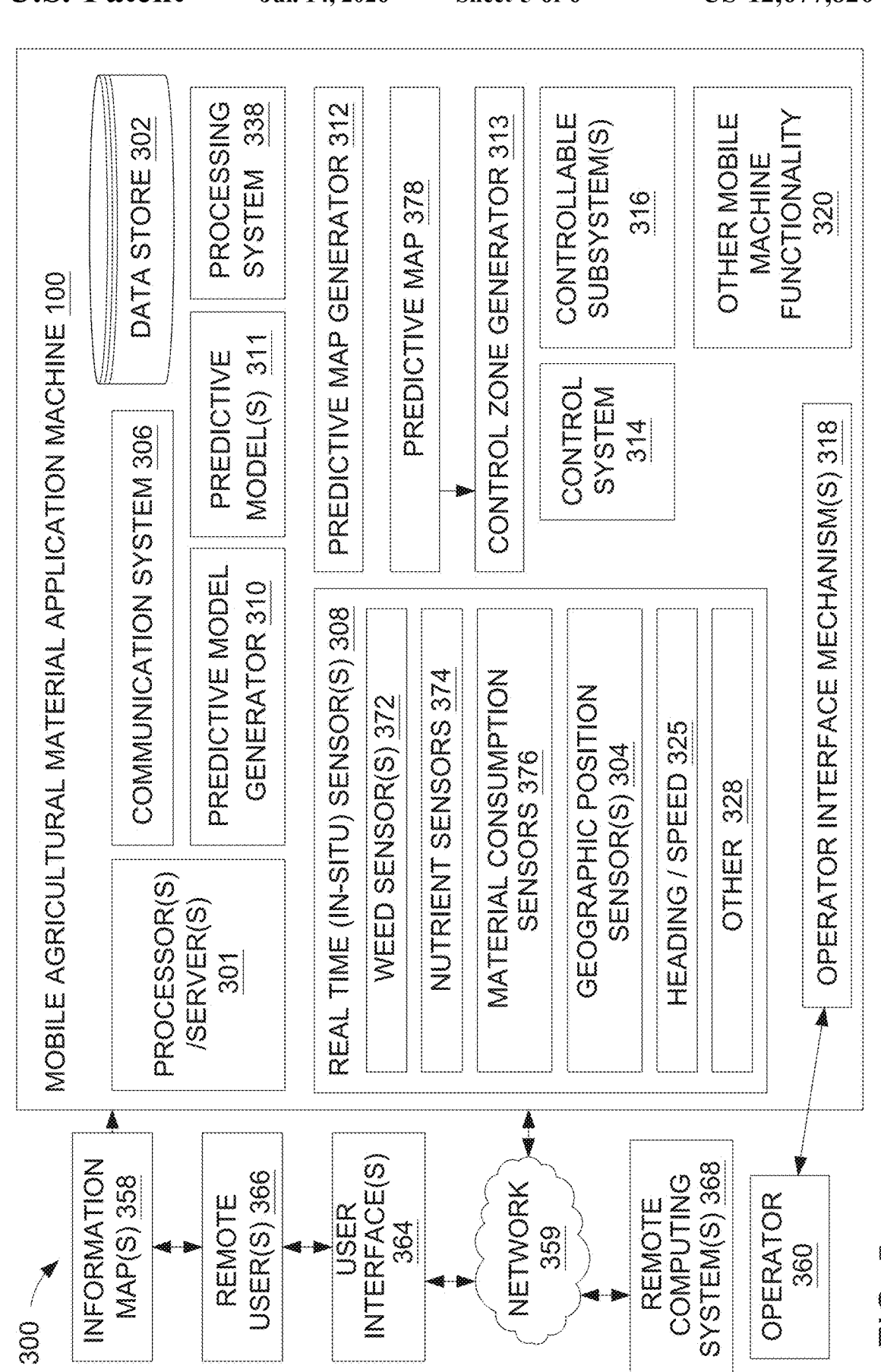
FIG. 5 is a block diagram of further aspects of the control system associated with the generation and use of weed distribution models for prediction of weed treatment product usage.

FIG. 5 is a block diagram showing some portions of an agricultural material application system architecture 300. Agricultural material application system 300 also includes one or more remote computing systems 368, one or more remote user interfaces 364, network 359, and one or more information maps 358. Mobile agricultural material application machine 100, itself, illustratively includes one or more processors or servers 301, data store 302, communication system 306, one or more in-situ sensors 308 that sense one or more characteristics at a field concurrent with an operation, and a processing system 338 that processes the sensor data (e.g., sensor signals, images, etc.) generated by in-situ sensors 308 to generate processed sensor data. The in-situ sensors 308 generate values corresponding to the sensed characteristics.

It will be appreciated that the various processors and processing system components such as data stores, etc. shown and described in FIG. 5 regarding the machine system architecture 300 of FIG. 5 may be in addition to or may be shared with the analogous components of the machine architecture 200 shown in FIG. 2. A single machine 100 may include architecture 200 alone, architecture 300 alone, a combination of both architectures 200 and 300, or either of the architectures 200 or 300 combined with selected aspects of the other.

Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and an operator interface mechanism 318. The mobile machine can also include a wide variety of other machine functionality 320.

The in-situ sensors 308 can be on-board mobile machine 100, remote from mobile machine 100, such as deployed at fixed locations on the worksite or on another machine operating in concert with mobile machine 100, such as an aerial vehicle, and other types of sensors, or a combination thereof. In-situ sensors 308 sense characteristics at the worksite during the course of an operation. In-situ sensors 308 illustratively include one or more weed sensors 372, one or more nutrient sensors 374, one or more material consumption sensors 376, geographic position sensors 304, heading/speed sensors 325, and can include various other sensors 328, such as the various other sensors described above.

Weed sensors 372 illustratively detect values of weed characteristics which can be indicative of weed presence, weed location, weed type, weed intensity, as well as various other weed characteristics. Weed sensors 372 can be located at various locations on material application machine 100 and can be configured to detect weed characteristics at the field ahead of material application machine 100 or ahead of a given component of material application machine 100, or both. Weed sensors 372 may include one or more of an imaging system (e.g., stereo or mono camera), optical sensors, radar, lidar, ultrasonic sensors, infrared or thermal sensors, as well as a variety of other sensors. In some examples, weed sensors 372 can be similar to or include the cameras 130. These are merely some examples. Weed sensors 372 can be any of a variety of different types of sensors.

Material consumption sensors 376 illustratively detect material consumption values which can be indicative of the amount of material (e.g., seed, dry or liquid material, fertilizer, herbicide, pesticide, etc.) consumed (e.g., used) by material application machine 100 at the field. The material consumption sensors 376 may for example detect the rate of product consumption from the first and second tanks 104A and 104B. Material consumption sensors 376 can be located at various locations on material application machine. Material consumption sensors 376 can include fill level sensors that detect a fill level of a material container, such as tanks 104A and 104B. In some examples, material consumption sensors 376 can detect a flow rate of material, such as flow sensors (e.g., flow meters) that detect a volumetric flow of material through a delivery line. In some examples, material consumption sensors 376 can provide a count of the material consumed. In some examples, observation sensor systems may detect the material consumed. In some examples, material consumption sensors 376 can include sensors that detect the operating parameters of one or more actuators, such as the speed (or rate) at which the actuators actuate to control the rate of material. These are merely some examples. Material consumption sensors 376 can be any of a variety of different types of sensors.

Geographic position sensors 304 illustratively sense or detect the geographic position or location of mobile machine 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors.

Heading/speed sensors 325 detect a heading and speed at which mobile machine 100 is traversing the worksite during the operation. This can include sensors that sense the movement of ground-engaging elements (e.g., wheels or tracks), or can utilize signals received from other sources, such as geographic position sensor 304, thus, while heading/speed sensors 325 as described herein are shown as separate from geographic position sensor 304, in some examples, machine heading/speed is derived from signals received from geographic positions sensor 304 and subsequent processing. In other examples, heading/speed sensors 325 are separate sensors and do not utilize signals received from other sources.

In-situ data includes data taken from a sensor on-board the mobile machine 100 or taken by any sensor where the data are detected during the operation of mobile machine 100 at a field.

Processing system 338 processes the sensor data (e.g., signals, images, etc.) generated by in-situ sensors 308 to generate processed sensor data indicative of one or more characteristics. For example, processing system generates processed sensor data indicative of characteristic values based on the sensor data generated by in-situ sensors 308, such as weed values based on sensor data generated by weed sensors 372, nutrient values based on sensor data generated by nutrient sensors 374, and material consumption values based on sensor data generated by material consumption sensors 376. Processing system 338 also processes sensor data generated by other in-situ sensors 308 to generate processed sensor data indicative of other characteristic values, such as machine speed characteristic (travel speed, acceleration, deceleration, etc.) values based on sensor data generated by heading/speed sensors 325, machine heading values based on sensor data generated by heading/speed sensors 325, geographic position (or location) values based on sensor data generated by geographic position sensors 304, as well as various other values based on sensors signals generated by various other in-situ sensors 328.

Figure 4:
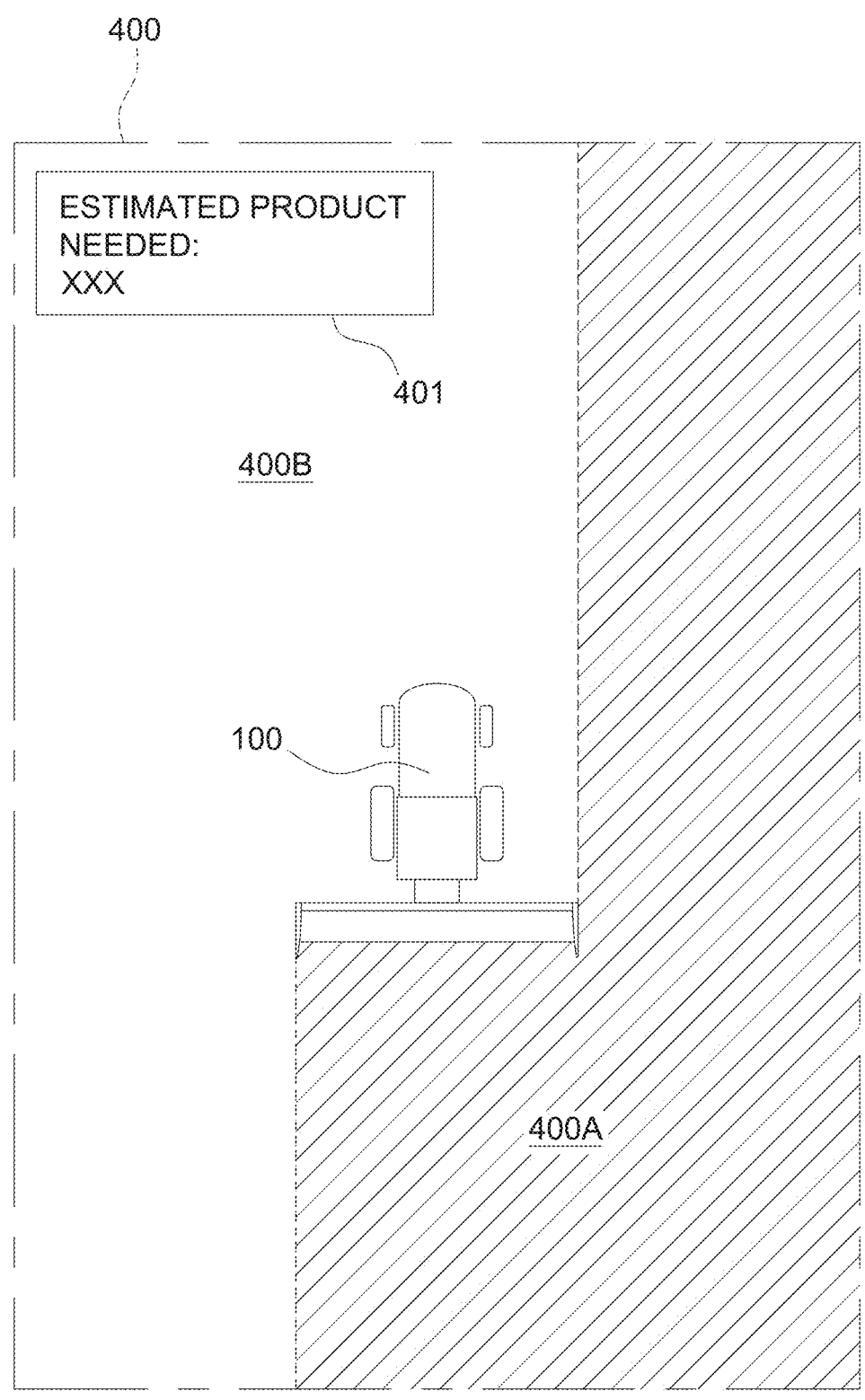
FIG. 4 is a user interface display showing a field map that visually distinguishes an initial portion of the field which has been sprayed from a remaining portion of the field to be sprayed.

For example, as schematically shown in FIG. 4, the processing system 338 may track the progress of the machine 100 as it travels through an initial portion 400A of a field 400 (shown cross-hatched in FIG. 4) while treating the initial portion of the field with first product from the first tank 104A and with second product from the second tank 104B. The first product may be used to selectively treat a first weed type and the second product may be used to selectively treat a second weed type. The processor may then estimate the quantity of the first and second product required to complete the treatment of the remaining portion or remainder 400B of the field 400 based upon analysis of the weed distribution model for the remaining portion 400B of the field. This estimate of the expected product usage for the remaining portion 400B of the filed may be continuously recalculated and displayed to the operator as indicated at 401.

It will be understood that processing system 338 can be implemented by one or more processers or servers, such as processors or servers 301. Additionally, processing system 338 can utilize various sensor signal filtering functionalities, noise filtering functionalities, sensor signal categorization, aggregation, normalization, as well as various other processing functionalities. Similarly, processing system 338 can utilize various image processing functionalities such as, sequential image comparison, RGB, edge detection, black/white analysis, machine learning, neural networks, pixel testing, pixel clustering, shape detection, as well any number of other suitable processing and data extraction functionalities.

FIG. 5 also shows that an operator 360 may operate mobile machine 100. The operator 360 interacts with operator interface mechanisms 318. In some examples, operator interface mechanisms 318 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 360 may interact with operator interface mechanisms 318 using touch gestures. In some examples, at least some operator interface mechanisms 318 may be disposed in an operator compartment of mobile machine 100. In some examples, at least some operator interface mechanisms 318 may be remote (or separable) from mobile machine 100 but are in communication therewith. Thus, the operator 360 may be local or remote. These examples described above are provided as illustrative examples and are not intended to limit the scope of the present disclosure. Consequently, other types of operator interface mechanisms 318 may be used and are within the scope of the present disclosure.

FIG. 5 also shows remote users 366 interacting with mobile machine 100 or remote computing systems 368, or both, through user interfaces mechanisms 364 over network 359. In some examples, user interface mechanisms 364 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, user 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, mobile machine 100 can be controlled remotely by remote computing systems 368 or by remote users 366, or both. As will be described below, in some examples, one or more of the components shown being disposed on mobile machine 100 in FIG. 5 can be located elsewhere, such as at remote computing systems 368.

FIG. 5 also shows that mobile machine 100 can obtain one or more information maps 358. As described herein, the information maps 358 include, for example, a soil property map, a yield map, a residue map, a constituents map, a seeding map, a topographic map, a vegetative index (VI) map, an optical map, a weed map, a contamination map, as well as various other maps. However, information maps 358 may also encompass other types of data, such as other types of data that were obtained prior to a current operation or a map from a prior operation. In other examples, information maps 358 can be generated during a current operation, such a map generated by predictive map generator 312 based on a predictive model 311 generated by predictive model generator 310.

Information maps 358 may be downloaded onto mobile material application machine 100 over network 359 and stored in data store 302, using communication system 306 or in other ways. The data store 302 may include a non-transitory medium on which the weed distribution model of the present disclosure may be stored. In some examples, communication system 306 may be a cellular communication system, a system for communicating over a wide area network or a local area network, a system for communicating over a near field communication network, or a communication system configured to communicate over any of a variety of other networks or combinations of networks. Network 359 illustratively represents any or a combination of any of the variety of networks. Communication system 306 may also include a system that facilitates downloads or transfers of information to and from a secure digital (SD) card or a universal serial bus (USB) card or both.

As described above, the present description relates to the use of models to predict one or more characteristics at the field at which mobile material application machine 100 is operating. The models 311 can be generated by predictive model generator 310, during the current operation.

In one example, predictive model generator 310 generates a predictive model 311 that is indicative of a relationship between the values sensed by the in-situ sensors 308 and values mapped to the field by the information maps 358. For example, if the information map 358 maps values of a characteristic to different locations in the worksite, and the in-situ sensor 308 are sensing values indicative of a characteristic (e.g., weed values, nutrient values, material consumption values, or speed characteristic values), then model generator 310 generates a predictive model that models the relationship between the values of the mapped characteristic and the values of the sensed characteristic.

In some examples, the predictive map generator 312 uses the predictive models generated by predictive model generator 310 to generate functional predictive maps that predict the value of a characteristic, sensed by the in-situ sensors 308, at different locations in the field based upon one or more of the information maps 358.

In one example, where the predictive model 311 is a predictive weed model that models a relationship between weed values sensed by in-situ sensors 308 and one or more of vegetative index values from a vegetative index map, optical characteristic values from an optical map, weed values from a weed map, and other characteristic values from another information map 358, then predictive map generator 312 generates a functional predictive weed map that predicts weed values at different locations at the worksite based on one or more of the mapped values at those locations and the predictive weed model.

In another example, where the predictive model 311 is a predictive material consumption model that models a relationship between material consumption values sensed by in-situ sensors 308 and one or more of soil property values from a soil property map, weed values from a weed map, contamination values from a contamination map, vegetative index values from a vegetative index map, topographic characteristic values from a topographic map, and other characteristic values from another information map 358, then predictive map generator 312 generates a functional predictive material consumption map that predicts material consumption values at different locations at the worksite based on one or more of the mapped values at those locations and the predictive material consumption model. For example, the predictive model 311 may predict the product usage from tanks 104A and 104B to treat first and second weed types in a remaining portion of the field.

In some examples, the information map 358 is from a prior pass through the field during a prior operation and the data type is the same as the data type sensed by in-situ sensors 308, and the data type in the predictive map 378 is also the same as the data type sensed by the in-situ sensors 308. For instance, the information map 358 may be a weed map generated during a previous year or earlier in the same season, and the variable sensed by the in-situ sensors 308 may be a weed value. The predictive map 378 may then be a predictive weed map that maps predictive weed values to different geographic locations in the field. In such an example, the relative weed value differences in the georeferenced information map 358 from the prior year or earlier in the same season can be used by predictive model generator 310 to generate a predictive model that models a relationship between the relative weed value differences on the information map 358 and the weed values sensed by in-situ sensors 308 during the current operation. The predictive model is then used by predictive map generator 310 to generate a predictive weed map. In another example, the information map 358 may be a nutrient map generated during a previous year or earlier in the same season, and the variable sensed by the in-situ sensors 308 may be a nutrient value. The predictive map 378 may then be a predictive nutrient map that maps predictive nutrient values to different geographic locations in the field. In such an example, the relative nutrient value differences in the georeferenced information map 358 from the prior year or earlier in the same season can be used by predictive model generator 310 to generate a predictive model that models a relationship between the relative nutrient value differences on the information map 358 and the nutrient values sensed by in-situ sensors 308 during the current operation. The predictive model is then used by predictive map generator 310 to generate a predictive nutrient map. In another example, the information map 358 may be a material consumption map generated during a previous year or earlier in the same season, and the variable sensed by the in-situ sensors 308 may be a material consumption value. The predictive map 378 may then be a predictive material consumption map that maps predictive material consumption values to different geographic locations in the field. In such an example, the relative material consumption value differences in the georeferenced information map 358 from the prior year or earlier in the same season can be used by predictive model generator 310 to generate a predictive model that models a relationship between the relative material consumption value differences on the information map 358 and the material consumption values sensed by in-situ sensors 308 during the current operation. The predictive model is then used by predictive map generator 310 to generate a predictive material consumption map. In another example, the information map 358 may be a speed map generated during a previous year or earlier in the same season, and the variable sensed by the in-situ sensors 308 may be a speed characteristic value. The predictive map 378 may then be a predictive speed map that maps predictive speed characteristic values to different geographic locations in the field. In such an example, the relative speed characteristic value differences in the georeferenced information map 358 from the prior year or earlier in the same season can be used by predictive model generator 310 to generate a predictive model that models a relationship between the relative speed characteristic value differences on the information map 358 and the speed characteristic values sensed by in-situ sensors 308 during the current operation. The predictive model is then used by predictive map generator 310 to generate a predictive speed map.

In another example, the information map 358 may be a topographic map generated during a prior operation in the same year and may map topographic characteristic values to different geographic locations in the field. The variable sensed by the in-situ sensors 308 during the current operation may be a nutrient value, a weed value, a material consumption value, or a speed characteristic value. The predictive map 378 may then map predictive characteristic values (e.g., nutrient values, weed values, material consumption values, or speed characteristic values) to different geographic locations in the field. In such an example, the topographic characteristic values at time of the prior operation are geo-referenced, recorded, and provided to mobile machine 100 as an information map 358 of topographic characteristic values. In-situ sensors 308 during a current operation can detect characteristic values (e.g., nutrient values, weed values, material consumption values, or speed characteristic values) at geographic locations in the field and predictive model generator 310 may then build a predictive model that models a relationship between characteristic values (e.g., nutrient values, weed values, material consumption values, or speed characteristic values) at the time of the current operation and topographic characteristic values at the time of the prior operation. This is because the topographic characteristic values at the time of the prior operation are likely to be the same as at the time of the current operation or may be more accurate or otherwise may be more reliable (or fresher) than topographic characteristic values obtained in other ways. For instance, a machine that operated on the field previously may provide topographic characteristic values that are fresher (closer in time) or more accurate than topographic characteristic values detected in other ways, such as satellite or other aerial-based sensing. For instance, vegetation on the field, meteorological conditions, as well as other obscurants, may obstruct or otherwise create noise that makes topographic characteristic values unavailable or unreliable. Thus, the topographic map generated during the prior operation may be more preferable. This is merely one example.

"Last Tank" Loading

The present disclosure combines the advantages of targeted spraying with the use of a weed distribution model to predict the required product usage to complete the spraying of a field. When the sprayer carries two or more tanks 104A and 104B for the application of two or more products for weed treatment, such predictions can be made separately for each of the products to be applied.

This particularly assists the farmer in improving efficiency and minimizing product waste by eliminating the need to guess how much product needs to be loaded in the tanks to finish the spraying of a field.

In its most simple embodiment applying only one product from one tank, such a method of operating the agricultural sprayer may include:

providing a weed distribution model for a field, the weed distribution model including information corresponding to a weed distribution as a function of geographic location within the field;

spraying an initial portion 400A of the field 400 with the agricultural sprayer 100 with the first product from the first tank 104A, thereby leaving a remaining portion 400B of the field to be sprayed;

estimating with a processor 338 an estimated quantity of the first product from the first tank 104A required to complete the spraying of the remaining portion 400B of the field based at least in part on the weed distribution model, the estimated quantity being less than the first tank capacity; and loading the estimated quantity of the first product into the first tank so that the remaining portion 400B of the field may be sprayed with the first tank 104A being empty, at least to a threshold level, at the end of the spraying of the remaining portion of the field.

Then the operator may spray the remaining portion 400B of the field with the first product from the first tank 104A, so that the first tank 104A is empty, at least to the threshold level, at the end of the spraying of the remaining portion 400B of the field.

In the more complicated situation where the sprayer includes a second tank 104B having a second tank capacity for holding a second product to be sprayed the spraying may include spraying the initial portion 400A of the field 400 with the first product from the first tank 104A and with the second product from the second tank 104B. The estimating may include estimating an estimated quantity of the second product from the second tank 104B required to complete the spraying of the remaining portion 400B of the field, the estimated quantity of the second product being less than the second tank capacity. The loading may include loading the estimated quantity of the second product into the second tank 104B so that the remaining portion 400B of the field may be sprayed with the second tank 104B being empty, at least to a threshold level, at the end of the spraying of the remaining portion 400B of the field.

When two products are available for treatment the method may include spraying a first weed type in the remaining portion 400B of the field with the first product from the first tank 104A and spraying a second weed type in the remaining portion of the field with second product from the second tank 104B. The first weed type may include grass and the second weed type may include broad leaf weeds.

The spraying of the first weed type and the second weed type is done via selective spraying. The spraying of the first weed type in the remaining portion 400B of the field with the first product includes detecting using the processor 250 and a sensor system 130 the presence of weeds of the first weed type ahead of the sprayer 100 and selectively spraying the weeds of the first weed type with the first product. The spraying of the second weed type in the remaining portion 400B of the field with the second product includes detecting using the processor 250 and the sensor system 130 the presence of weeds of the second weed type ahead of the sprayer 100 and selectively spraying the weeds of the second weed type with the second product. The method further includes avoiding spraying of locations in the field 400 not including weeds of either the first weed type or the second weed type.

Throughout a spraying operation the control system 210, 314 may be operative to save in the memory associated with the processor the locations in the field detected as having the presence of weeds, along with information identifying the types of weeds. This information can be used to update and improve the weed distribution models, and for other analysis such as the weed pressure analysis described below.

Weed Pressure Influencers

Analysis of the various information maps 358 discussed above and comparison of the same to the observed weed distribution within the field allows conclusions to be reached identifying the cause of weed pressure in each geographic location within the field. The farmer can find the main causes of weed pressure and identify the yield loss attributable to each cause of weed pressure. This allows the farmer to understand if their methods of weed management are making a difference. This information can then be used to change future treatments to maximize weed control.

Figure 6:
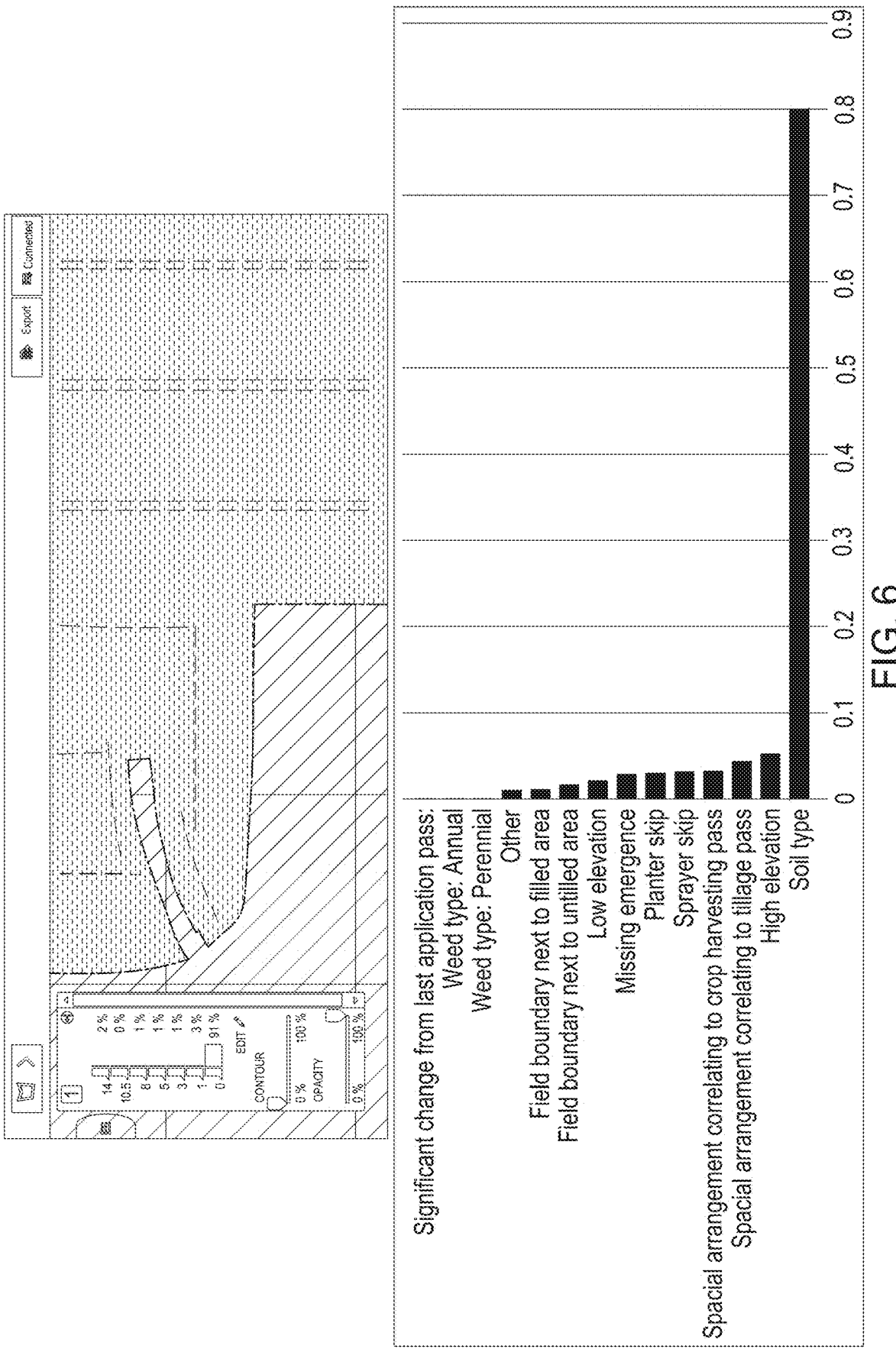
FIG. 6 is a user interface display showing in tabular form the influence of various parameters on weed presence in the field.

FIG. 6 includes in its upper part an exemplary depiction of the weed distribution in a field. Below that depiction is an exemplary graphical representation of the various possible sources of weed pressure and their statistical correlations to the observed weed distribution. In this example it is seen that the main contribution to weed distribution in the observed field is the "soil type" which has a 0.8 correlation to weed pressure. Next in significance is "high elevation" which has approximately a 0.05 correlation.

Such statistical correlations may be determined using standard statistical methods to correlate the presence of the underlying sources of weed pressure with the observed weed distribution.

The weed distribution model may also be used for other purposes. The weed distribution model may be used to predict how much product to order and have on-hand for the season by sensing weed types and distribution. The weed distribution model may be used to prioritize the order to spray fields based on sensed weed types and distribution.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of operating an agricultural sprayer, the sprayer including a first tank having a first tank capacity for holding a first product to be sprayed, the method comprising:

providing a weed distribution model for a field, the weed distribution model including information corresponding to a weed distribution as a function of geographic location within the field;

spraying an initial portion of the field with the agricultural sprayer with the first product from the first tank, thereby leaving a remaining portion of the field to be sprayed;

estimating with a processor an estimated quantity of the first product from the first tank required to complete the spraying of the remaining portion of the field based at least in part on the weed distribution model, the estimated quantity being less than the first tank capacity; and loading the estimated quantity of the first product into the first tank so that the remaining portion of the field may be sprayed with the first tank being empty, at least to a threshold level, at an end of the spraying of the remaining portion of the field.

2. The method of claim 1, further comprising:

spraying the remaining portion of the field with the first product from the first tank, so that the first tank is empty, at least to the threshold level, at the end of the spraying of the remaining portion of the field.

3. The method of claim 1, wherein the sprayer includes a second tank having a second tank capacity for holding a second product to be sprayed, wherein:

the spraying includes spraying the initial portion of the field with the first product from the first tank and with the second product from the second tank;

the estimating includes estimating an estimated quantity of the second product from the second tank required to complete the spraying of the remaining portion of the field, the estimated quantity of the second product being less than the second tank capacity; and the loading includes loading the estimated quantity of the second product into the second tank so that the remaining portion of the field may be sprayed with the second tank being empty, at least to a threshold level, at the end of the spraying of the remaining portion of the field.

4. The method of claim 3, further comprising:

spraying a first weed type in the remaining portion of the field with the first product from the first tank and spraying a second weed type in the remaining portion of the field with second product from the second tank.

5. The method of claim 4, wherein:

the first weed type includes grass and the second weed type includes broad leaf weeds.

6. The method of claim 4, wherein:

the spraying of the first weed type in the remaining portion of the field with the first product includes detecting using the processor and a sensor system a presence of weeds of the first weed type ahead of the sprayer and selectively spraying the weeds of the first weed type with the first product;

the spraying of the second weed type in the remaining portion of the field with the second product includes detecting using the processor and the sensor system a presence of weeds of the second weed type ahead of the sprayer and selectively spraying the weeds of the second weed type with the second product; and the method further includes avoiding spraying of locations in the field not including weeds of either the first weed type or the second weed type.

7. The method of claim 1, wherein:

the weed distribution model includes information identifying the weed distribution to be treated from the first tank as a function of geographic location within the field.

8. The method of claim 1, wherein:

the weed distribution model includes information identifying a predictive product usage corresponding to the weed distribution to be treated from the first tank as a function of geographic location within the field.

9. The method of claim 1, wherein:

the weed distribution model includes image information showing the weed distribution to be treated from the first tank, and the method further includes analyzing the image information to determine the weed distribution to be treated from the first tank.

10. The method of claim 1, wherein:

the spraying includes detecting using the processor and a sensor system a presence of weeds ahead of the sprayer and selectively spraying under control of the processor the weeds with the first product.

11. The method of claim 10, further comprising:

saving in a memory associated with the processor the locations in the field detected as having the presence of weeds.

12. An agricultural sprayer, comprising:

a first tank having a first tank capacity for holding a first product to be sprayed;

a second tank having a second tank capacity for holding a second product to be sprayed;

a product application system including a plurality of selectively actuatable applicator mechanisms configured to apply the first and second products on a field;

an imaging system configured to obtain image data indicative of plant matter on the field; and a control system configured to:

receive a weed distribution model for the field, the weed distribution model including information corresponding to a weed distribution as a function of geographic location within the field;

identify a remaining portion of the field which has not yet been sprayed with the first product and the second product;

estimate a first estimated quantity of the first product from the first tank and a second estimated quantity of the second product from the second tank required to complete the spraying of the remaining portion of the field based at least in part on the weed distribution model;

display the first estimated quantity and the second estimated quantity on a display observable by an operator of the sprayer so that the operator may load the first tank and the second tank with amounts of the first and second product, respectively, sufficient to complete the spraying of a remainder of the field with the first tank and the second tank being empty, at least to a threshold level, at an end of the field;

detect a presence of weeds of a first weed type ahead of the sprayer and selectively spray the weeds of the first weed type with the first product; and detect a presence of weeds of a second weed type ahead of the sprayer and selectively spray the weeds of the second weed type with the second product.

13. The agricultural sprayer of claim 12, wherein:

the control system includes the weed distribution model stored on a non-transitory medium.

14. The agricultural sprayer of claim 13, wherein:

the weed distribution model includes information corresponding to distribution of weeds of the first weed type and weeds of the second weed type as a function of geographic location in the field.

15. The agricultural sprayer of claim 14, wherein:
the first weed type includes grass and the second weed
   type includes broad leaf weeds.

16. The agricultural sprayer of claim 13, wherein:
the weed distribution model includes information identi-
   fying a predictive product usage corresponding to the
   weed distribution to be treated from the first tank and
   the second tank as a function of geographic location
   within the field.

\* \* \* \* \*